(12) United States Patent
Cha et al.

(10) Patent No.: US 9,352,699 B2
(45) Date of Patent: May 31, 2016

(54) CARRIER APPARATUS FOR VEHICLE

(71) Applicant: Hyundai Motor Company, Seoul (KR)

(72) Inventors: Dong Eun Cha, Suwon-si (KR); Hyun Gyung Kim, Hwaseong-si (KR); Seung Mok Lee, Osan-si (KR); Phil Jung Jeong, Yongin-si (KR); Nam Cheol Kim, Suwon-si (KR); Soo Hyun Hyun, Gyeongju-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/549,940

(22) Filed: Nov. 21, 2014

(65) Prior Publication Data

US 2016/0052458 A1 Feb. 25, 2016

(30) Foreign Application Priority Data

Aug. 19, 2014 (KR) .......................... 10-2014-0107778

(51) Int. Cl.
*B60R 9/06* (2006.01)
*B60R 9/10* (2006.01)

(52) U.S. Cl.
CPC .... *B60R 9/06* (2013.01); *B60R 9/10* (2013.01)

(58) Field of Classification Search
CPC .................................. B60R 9/06; B60R 9/10
USPC .......... 224/281, 282, 491, 496, 497, 504, 924
See application file for complete search history.

(56) References Cited

U.S. PATENT DOCUMENTS

| | | | | |
|---|---|---|---|---|
| 6,139,247 A * | 10/2000 | Wright | ...................... | B60R 9/06 224/519 |
| 6,783,315 B1 * | 8/2004 | Senechal | ................... | B60P 1/43 224/502 |
| 6,786,693 B1 * | 9/2004 | Neale | ....................... | B60P 3/122 414/462 |
| 7,909,213 B2 * | 3/2011 | Bergerhoff | ............... | B60R 9/10 224/197 |
| 9,039,263 B2 * | 5/2015 | Hofmann | .................. | B60R 9/10 362/549 |
| 2008/0142559 A1 | 6/2008 | Lim et al. | | |
| 2011/0002763 A1 * | 1/2011 | Earl | ........................ | B60P 1/431 414/523 |

FOREIGN PATENT DOCUMENTS

| | | | | |
|---|---|---|---|---|
| EP | 2033845 A1 * | 3/2009 | ............... | B60R 9/06 |
| EP | 2428406 A2 * | 3/2012 | ............... | B60R 9/06 |
| EP | 2570305 A2 | 3/2013 | | |
| JP | 11-028983 A | 2/1999 | | |
| JP | 2008-013175 A | 1/2008 | | |
| KR | 10-2011-0034733 A | 4/2011 | | |
| KR | 10-2011-0050162 A | 5/2011 | | |
| KR | 10-2013-0036913 A | 4/2013 | | |

* cited by examiner

*Primary Examiner* — Gary Elkins
(74) *Attorney, Agent, or Firm* — Morgan, Lewis & Bockius LLP

(57) ABSTRACT

A carrier apparatus for a vehicle may include guide rails symmetrically disposed under a rear bumper beam and extending in a front-rear direction, a carrier having a panel and sliding rails and stowed or drawn out under the rear bumper beam by sliding in the front-rear direction along the guide rails, tilting rails extending on same lines at rear ends of the guide rails and capable of tilting on the rear bumper beam, tilting adjusters disposed adjacent the tilting rails at the rear ends of the guide rails and restricting turning of the tilting rails by being selectively coupled to the tilting rails, and damping units having first ends connected to the guide rails and second ends connected to the tilting adjusters, and reducing turning speed of the tilting rails when the tilting adjusters are separated from the tilting rails and the tilting rails turn.

19 Claims, 10 Drawing Sheets

CARRIER APPARATUS FOR VEHICLE

CROSS REFERENCE TO RELATED APPLICATION

The present application claims priority of Korean Patent Application Number 10-2014-0107778 filed Aug. 19, 2014, the entire contents of which are incorporated herein for all purposes by this reference.

BACKGROUND OF THE INVENTION

1. Field of the Invention

The present invention, in general, relates to a carrier disposed on the rear bumper of a vehicle to load a bicycle or packages, and, more particularly, to a carrier apparatus for a vehicle that is stowed in a rear bumper beam when not in use, but is drawn out and capable of tilting at a predetermined position to load a bicycle on a vehicle.

2. Description of the Related Art

Recently, as people use bicycles for leisure activities, they load bicycles on vehicles to transport them to bicycle-only roads or mountains.

However, bicycles are generally large in volume, so they are difficult to load even using the trunk or the backseat of vehicles.

Although various methods of loading a bicycle on the outer surfaces of vehicles have been proposed to solve the problem, the manner of loading and fixing a bicycle on the roof panel of a vehicle not only makes loading itself very inconvenient, but increases the height of the vehicle, such that it may cause safety accidents due to the bicycle hitting the ceiling of a tunnel or a building when the vehicle enters these structures.

In the case of a bicycle mounted on the tailgate of a vehicle, complex installation is required for a specific carrier device; and the carrier device remains visible even when there is no bicycle mounted thereon, thereby detracting from the external appearance of a vehicle.

Further, it is troublesome to install the carrier device in order to load a bicycle and to remove the carrier device, when there is no need for use, thus decreasing convenience.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

Accordingly, the present invention has been made keeping in mind the above problems occurring in the related art and/or other problems, and the present invention is intended to provide a carrier apparatus for a vehicle which is disposed inside a rear bumper beam of a vehicle, is not exposed to the outside when not in use, and can both preserve the external appearance of the vehicle and improve convenience by being drawn out of a rear bumper beam so that a bicycle can be loaded, when the bicycle loading is desired.

According to various aspects of the present invention, there is provided carrier apparatus for a vehicle, which includes: guide rails substantially symmetrically disposed under a rear bumper beam and extending in a front-rear direction; a carrier having a panel and sliding rails extending from both sides of the panel to the corresponding guide rails, and stowed or drawn out under the rear bumper beam by sliding in the front-rear direction along the guide rails 100; tilting rails extending on the same lines at rear ends of the guide rails and capable of tilting on the rear bumper beam; tilting adjusters disposed adjacent the tilting rails at the rear ends of the guide rails and restricting turning of the tilting rails by being selectively coupled to the tilting rails; and damping units having first ends connected to the guide rails and second ends connected to the tilting adjusters, and reducing turning speed of the tilting rails when the tilting adjusters are separated from the tilting rails and the tilting rails turn.

An operation lever may be disposed on the panel of the carrier, and the carrier apparatus may further include: a movable bar extending forward from the operation lever and moving in the front-rear direction when the operation lever is operated; and a tilting holding mechanism connecting the sliding rails with each other at a rear end of the carrier, connected with the movable bar, and selectively coupled to or separated from the guide rails by moving laterally when the movable bar moves in the front-rear direction.

The tilting holding mechanism may include: a support bar connecting the sliding rails with each other at the rear end of the carrier; a circular gear hinged to the support bar and rotating with the front-rear movement of the movable bar; and sliding bars selectively coupled to or separated from the guide rails by laterally sliding along the support bar, and having first ends supported by the carrier and second ends having horizontal gears engaged with the circular gear.

A first end of the movable bar may be connected to the operation lever and a second end of the movable bar may have a coupling gear extending in the front-rear direction and engaged with the circular gear.

Fixing pins supported on the carrier through the sliding rails of the carrier may be formed at the first ends of the sliding bars and fixing grooves in which the fixing pins of the sliding bar are inserted may be formed at the guide rails.

When the operation lever is operated to turn the carrier, the movable bar may move forward, and as the circular gear rotates with the forward movement of the movable bar, the horizontal gears may be moved by the circular gear and the sliding bars may move inward and separate from the guide rails.

A driving unit may be disposed on the carrier and have driving links extending laterally toward the sliding rails, and when the driving unit is operated, power may be transmitted through the driving links so that the carrier slides along the guide rails.

Pinion gears may be disposed on the extending ends of the driving links and rack gears extending in the front-rear direction and engaged with the pinion gears may be disposed on the guide rails, so that as the driving links are rotated by the driving unit, the pinion gears may move on the rack gears.

Each of the tilting rails may include a fixing bracket disposed at a rear end of a corresponding guide rail and a tilting bracket disposed behind the fixing bracket at the rear end of the corresponding guide rail and capable of turning on the rear bumper beam.

The fixing brackets of the tilting rails may be fixed to the rear end of the guide rails, and each tilting bracket may include a fixing member fixed to the rear bumper beam and extending downward and a tilting member disposed adjacent and behind a corresponding fixing bracket and capable of turning on the fixing member.

A tilting stopping groove may be formed at the end, adjacent the corresponding fixing bracket, of the tilting member of the tilting bracket and a tilting adjuster of the tilting adjusters selectively inserted into the tilting stopping groove of the tilting member may be disposed on the corresponding fixing bracket.

The tilting adjusters may include first solenoids.

A second solenoid may be disposed on the tilting member of the tilting bracket and a sliding stopping groove to which the second solenoid is selectively coupled may be formed on a corresponding sliding rail of the carrier.

The damping units may include gas lifts with first ends pivotably connected to the rear ends of the guide rails and second ends pivotably connected to the tilting rails.

Support ends may be formed at the guide rails by bending the rear ends of the guide rails downward at a predetermine angle and the tilting rails that have turned keep the turned positions in contact with the support ends.

Damping members may be disposed on the support ends of the guide rails so that shock is offset by the damping members when the tilting rails come in contact with the damping members.

According to the carrier apparatus for a vehicle of the present invention, the bicycle carrier is installed inside the bumper back beam at the rear of a vehicle, so it is not exposed to the outside in normal times, but automatically slides out from the rear bumper beam to load a bicycle, and therefore, the external appearance is maintained and convenience is also improved.

Further, since the carrier can tilt after being drawn out, rear loading can be more conveniently performed, and since shock in tilting is removed, the carrier can smoothly tilt, thereby improving the commercial value.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
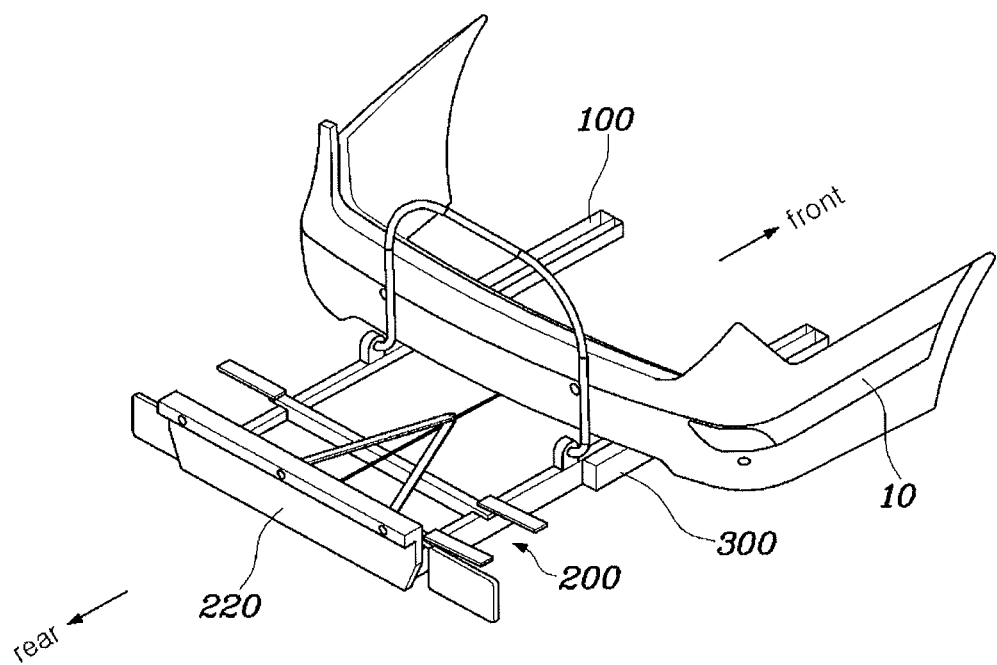
FIG. 1 is a perspective view of an exemplary carrier apparatus for a vehicle according to the present invention.
Figure 2:
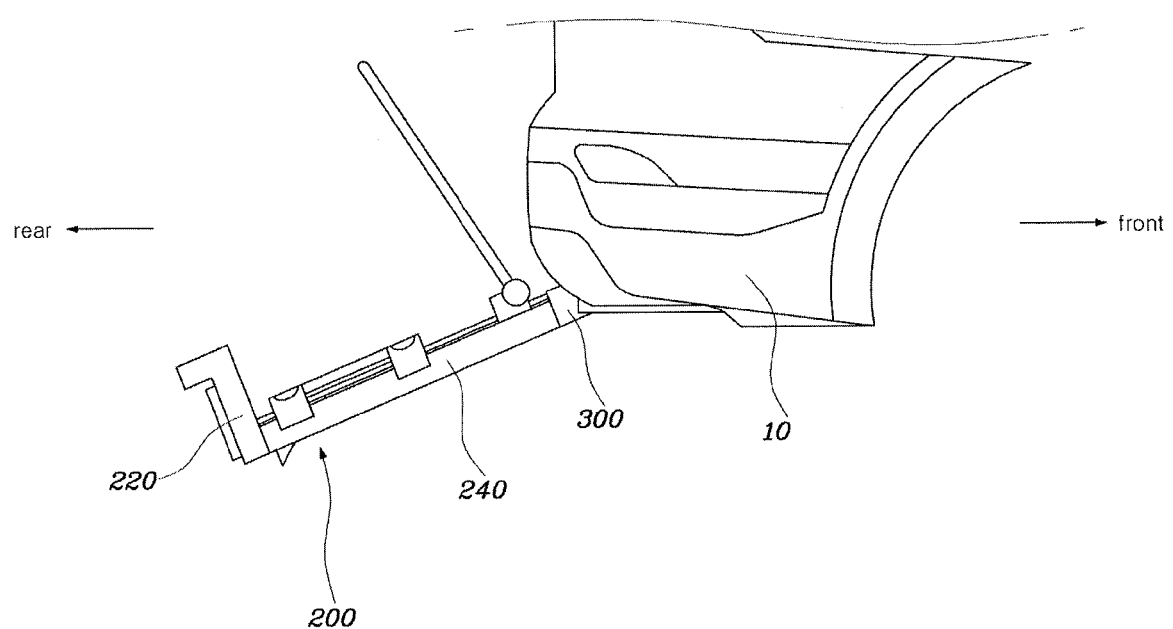
FIG. 2 is a view showing tiling of the carrier apparatus for a vehicle shown in FIG. 1.
Figure 3:
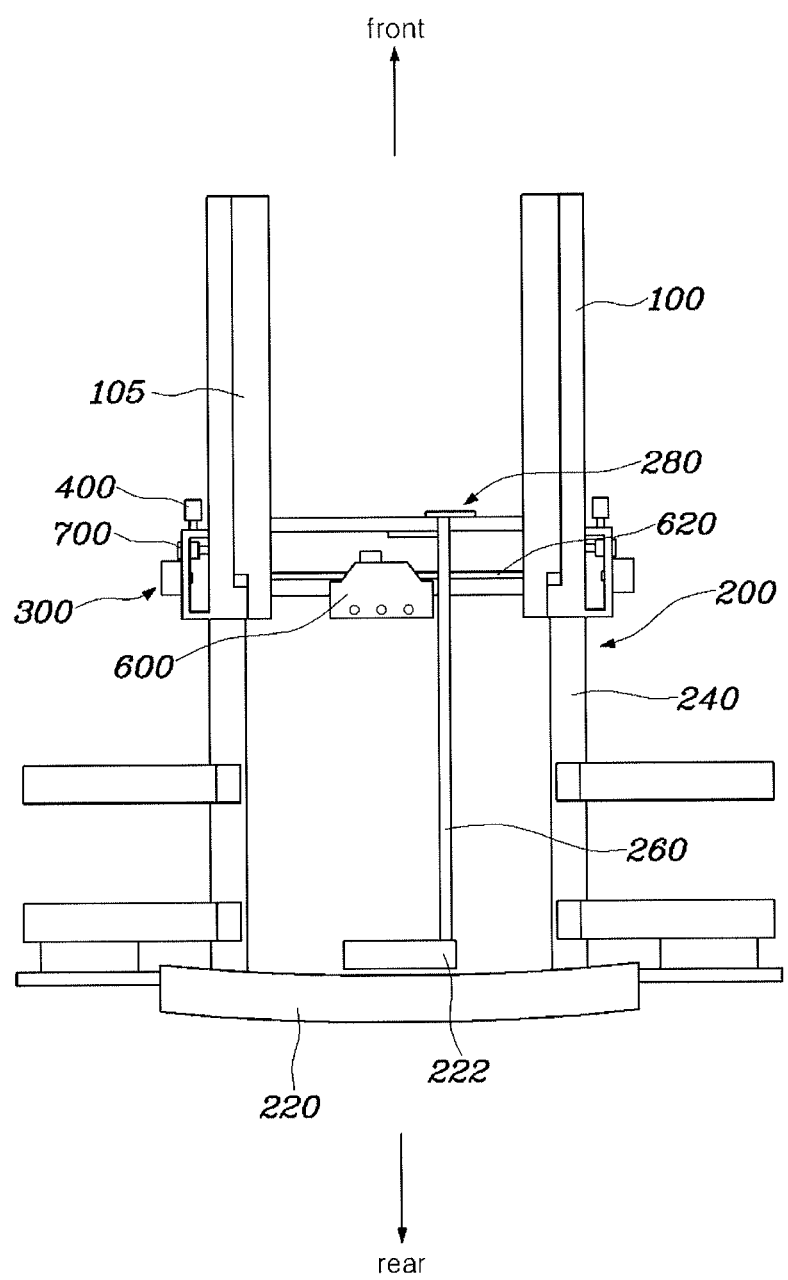
FIG. 3 is a view illustrating the carrier apparatus for a vehicle shown in FIG. 1.

FIG. 1 is a perspective view of a carrier apparatus for a vehicle according to various embodiments of the present invention, FIG. 2 is a view showing tiling of the carrier apparatus for a vehicle shown in FIG. 1, and FIGS. 3 to 10 are views illustrating the carrier apparatus for a vehicle.

The carrier apparatus of the present invention is installed at a rear bumper and it is drawn out rearward and moved forward to be stowed. It should be understood that the carrier apparatus may be disposed at the front or sides of vehicles, depending on the vehicles, and it may be drawn out in different directions, depending on the installation position.

As shown in the figures, a carrier apparatus for a vehicle includes: guide rails 100 that are symmetrically or substantially symmetrically disposed under a rear bumper beam 10 and extend in the front-rear direction; a carrier 200 that has a panel 220 and sliding rails 240 extending from both sides of the panel 220 to the guide rails 100 and is stowed or drawn out under the rear bumper beam 10 by sliding in the front-rear direction along the guide rails 100; tilting rails 300 that extend on the same lines at the rear ends of the guide rails 100 and are capable of tilting on the rear bumper beam 10; tilting adjusters 400 that are disposed close to the tilting rails 300 at the rear ends of the guide rails 100 and restrict turning of the tilting rails 300 by being selectively coupled to the tilting rails 300; and damping units 500 of which first ends are connected to the guide rails 100 and second ends are connected to the tilting adjusters 400 and which reduces turning speed of the tilting rails 300 when the tilting adjusters 400 are separated from the tilting rails 300 and the tilting rails 300 turn.

The carrier apparatus of the present invention may be installed inside the rear bumper beam 10 at the rear of a vehicle, and may be stowed in or drawn out from the rear bumper beam 10 or stowed or drawn out from under the rear bumper beam 10.

Since the carrier apparatus is stowed in and drawn out from the rear bumper beam 10 of a vehicle, exposure of the carrier apparatus to the outside is minimized, so the design of the vehicle is not disturbed by the carrier apparatus, and additionally, breakdown of the carrier apparatus due to dirt is prevented.

The guide rails 100 are fixed symmetrically or substantially symmetrically at both sides of the rear bumper beam 10, extending in the front-rear direction. That is, the carrier apparatus is stowed in or drawn out from the rear bumper beam 10 by sliding along the guide rails 100.

The carrier 200 has a panel 220 in the same plane as the rear bumper beam 10 and the sliding rails 240 extending rearward from both sides of the panel 220 are connected to the guide rails 100. That is, as the sliding rails 240 of the carrier 200 move along the guide rails, the carrier apparatus is stowed or drawn out.

Figure 4:
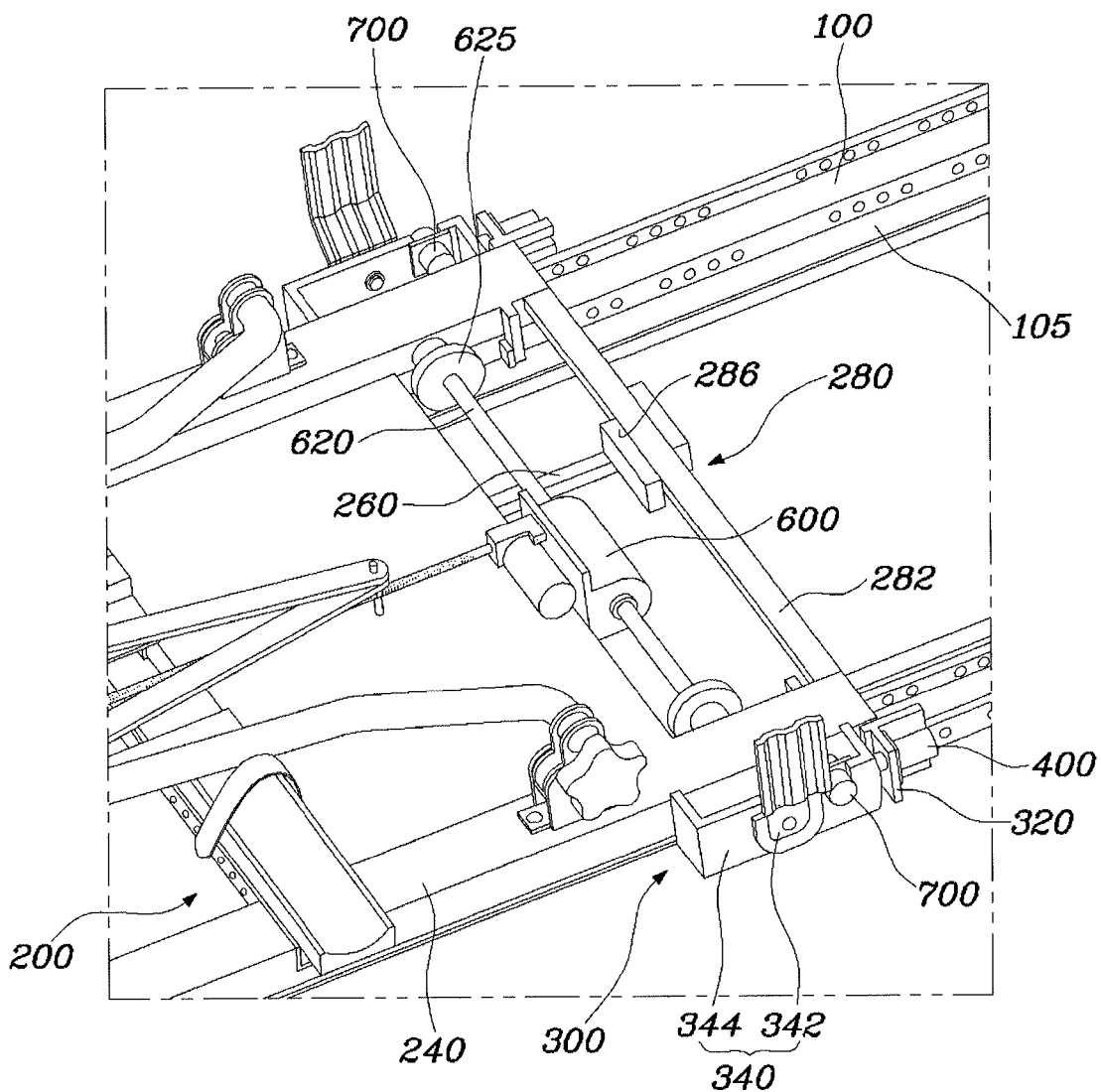
FIG. 4 is a view illustrating the carrier apparatus for a vehicle shown in FIG. 1.

In detail, as shown in FIG. 4, a driving unit 600 is disposed on the carrier 200 and has driving links 620 extending laterally toward the sliding rails 240, so that when the driving unit 600 is operated, power is transmitted through the driving links 620 and accordingly, the carrier 200 can slide along the guide rails 100. The driving unit 600 may be a motor capable of rotating forward/backward.

In detail, pinion gears 625 are disposed on the extending ends of the driving links 620 and rack gears 105 extending in the front-rear direction and engaged with the pinion gears 625 are disposed on the guide rails 100, such that as the driving links 620 are rotated by the driving unit 600, the pinion gears 625 can move on the rack gears 105.

That is, the rack gears 105 are elongated in the front-rear direction on the guide rails 100 and the pinion gears 625 engaged with the rack gears 105 are disposed on the driving links 620 extending from the driving unit 600, so that as the driving unit 600 is operated, the driving links 620 are rotated and the pinion gears 625 are rotated with the rotation of the driving links 620, and accordingly the carrier 200 is moved along the rack gears 105.

Further, the guide rails 100 may be further provided with a solenoid selectively allowing the carrier 200 to slide out by being selectively coupled to the sliding rails 200 of the carrier 200. They will be described in detail, when second solenoids 700 are described below.

The solenoids may be operated in combination with the driving unit 600 and are separated from the carrier 200 such that the carrier 200 can slide, when the carrier 200 is drawn out, so that the carrier 200 can be stowed or drawn out.

In the present invention, the carrier 200 is stowed in or drawn out from the rear bumper beam 10 and it also can tilt at a predetermined angle after being drawn out.

To this end, the tilting rails 300 extending on the same lines at the rear ends of the guide rails 100 and capable of tilting on the rear bumper beam 10 are provided, such that the carrier 200 tilts, when it is fully drawn out on the tilting rails 300.

In order to control turning of the tilting rails 300, there are provided the tilting adjusters 400 disposed close to the tilting rails 300 at the rear ends of the guide rails 100 and restricting the turning of the tilting rails 300 by being selectively connected to the tilting rails 300.

When the carrier 200 is loaded with a bicycle or an object, its weight increases and it may be broken due to excessive turning speed when it tilts. Accordingly, the damping units 500 of which the first ends are connected to the tilting adjusters 400 and which reduce the turning speed of the tilting rails 300 are provided so that the carrier 200 can stably turn.

In detail, as shown in FIGS. 3 to 6, an operation lever 222 is disposed on the panel 220 of the carrier 200. The carrier apparatus may further include a movable bar 260 extending forward from the operation lever 222 and moving in the front-rear direction when the operation lever 222 is operated and a tilting holding mechanism 280 connecting the sliding rails 240 with each other at the rear end of the carrier 200, connected with the movable bar 260, and coupled to or separated from the guide rails 100 by moving laterally when the movable bar 260 moves in the front-rear direction.

This configuration is provided to control tilting of the carrier 200 fully drawn out from the rear bumper beam 10. That is, the operation lever 222 that a user operates is disposed on the panel 220 of the carrier 200, and when the operation lever 222 is operated, the movable bar 260 moves in the front-rear direction and the tilting holding mechanism 280 is operated so that the carrier 200 turns.

In detail, the tilting holding mechanism 280 may be composed of or include a support bar 282 connecting the sliding rails 240 with each other at the rear end of the carrier 200, a circular gear 284 hinged to the support bar 282 and rotating with the front-rear movement of the movable bar 260, and sliding bars 286 coupled to or separated from the guide rails 100 by laterally sliding along the support bar 282 and having a first end supported by the carrier 200 and a second end having a horizontal gear 286a engaged with the circular gear 284.

That is, the support bar 282 connects the sliding rails 240 with each other at the rear end of the carrier 200 and the sliding bars 286 laterally move along the support bar 282.

The circular gear 282 is disposed at the center of the support bar 282 and the movable bar 260 extending from the operation lever 222 is engaged with the circular gear 284, so when the movable bar 260 moves in the front-rear direction, the circular gear 284 rotates. In this configuration, a first end of the movable bar 260 is connected to the operation lever 222 and a coupling gear 260a engaged with the circular gear 284 is elongated in the front-rear direction on a second end of the movable bar 260, so the movable bar 260 and the circular gear 284 can be engaged.

The sliding bars 286 are disposed on the support bar 282, with a first end through the carrier 200 and a second end engaged with the circular gear 284 by the horizontal gear 286a, such that as the circular gear 284 rotates, the horizontal gears 286 are moved by the engagement and the sliding bars 286 are coupled to or separated from the guide rails 100. That is, a fixing pin 286b supported on the carrier 200 through a sliding rail 240 of the carrier 200 is formed at first ends of the sliding bars 286 and a fixing groove 120 in which the fixing pin 286b of the sliding bar 286 is inserted is formed at a guide rail 100, so the sliding bars 286 can be coupled to or separated from the guide rails 100.

The fixing pin 286b of the sliding bars 286 may not be separated from the sliding rails 240 of the carrier 200, even if the operation lever 222 is fully operated and may be symmetrically or substantially symmetrically formed with the circular gear 284 therebetween. The fixing grooves 120 of the guide rails 100 may be formed at positions corresponding to the fixing pins 286a of the sliding bars 286 with the carrier 200 fully drawn out.

When the fixing pins 286b of the sliding bars 286 are inserted in the fixing grooves 120 of the guide rails 100, the carrier 200 and the guide rails 100 are coupled together, so the tilting rails 300 cannot turn. In contrast, when the fixing pins 286b of the sliding bars 286 are pulled out of the fixing grooves 120 of the guide rails 100, the carrier 200 turns with the tilting rails 300.

To this end, when the operation lever 222 is operated to turn the carrier 200, the movable bar 260 moves forward; and as the circular gear 284 rotates with the forward movement of the movable bar 260, the horizontal gears 286a move, such that the sliding bars 286 move inward and separate from the guide rails 100.

That is, when the operation lever 222 is operated, the movable bar 260 moves forward and the circular gear 284 engaged with the coupling gear 260a of the movable bar 260 rotates. As the circular gear 284 rotates, the sliding bars 286 coupled to the circular gear 284 by the horizontal gears 286a are pulled inward, such that the fixing pins 286b are pulled out from the fixing grooves 120. Accordingly, the tilting rails 300 are allowed to turn and the carrier 200 tilts.

Figure 10:
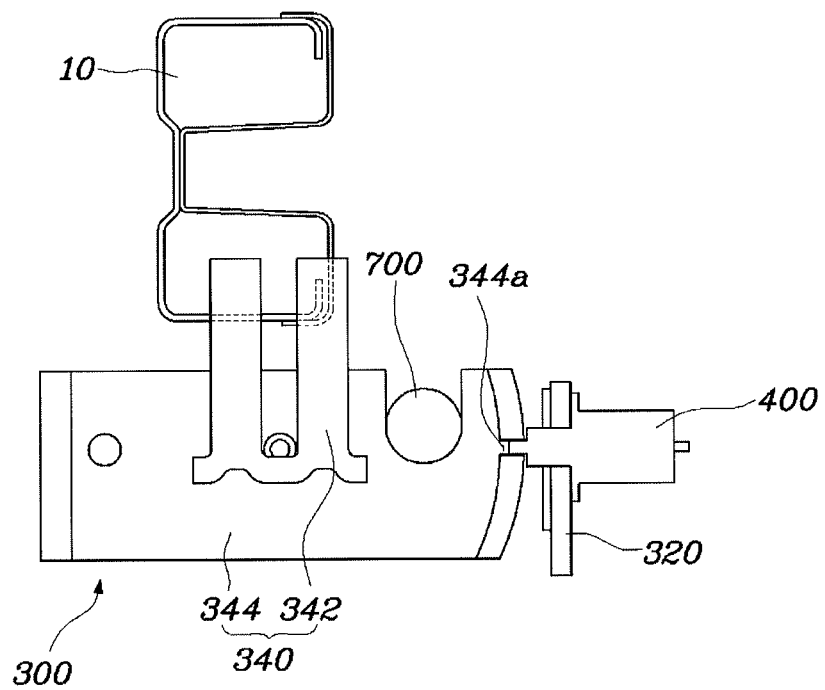
FIG. 10 is a view illustrating the carrier apparatus for a vehicle shown in FIG. 1.

On the other hand, as shown in FIG. 10, the tilting rail 300 may be composed of or include a fixing bracket 320 disposed at the rear end of the guide rail 100 and a tilting bracket 340 disposed behind the fixing bracket 320 at the rear end of the guide rail 100 and capable of turning on the rear bumper beam 10.

In detail, the fixing brackets 320 of the tilting rails 300 are fixed at the rear ends of the guide rails 100 and the tilting brackets 340 each may be composed of or include a fixing member 342 that is fixed to the rear bumper beam 10 and extends downward and a tilting member 344 that is disposed close to and behind the fixing bracket 320 and is capable of turning on the fixing member 342.

The tilting members 344 are provided with the same-shaped paths as the guide rails 100 to allow the sliding rails 240 of the carrier 200 to move, so the carrier 200 can move to the tilting members 344 along the guide rails 100. The tilting members 344 are hinged to the fixing members 342 to be able to turn, so when the carrier 200 is fully drawn out to the position of the tilting members 344, the tilting members 344 turn about the hinged points on the fixing members 342 and the carrier 200 tilts accordingly.

On the other hand, as shown in FIG. 10, a tilting stopping groove 344a may be formed at the end, which is close to the fixing bracket 320, of the tilting member 344 of the tilting bracket 340 and the tilting adjuster 400 that is selectively inserted into the tilting stopping groove 344a of the tilting member 344 may be disposed on the fixing bracket 320.

The tilting adjuster 400 may be a first solenoid disposed on the fixing bracket 320 such that a solenoid pin stretches out rearward, and the tilting stopping groove 344a is formed at the front end of the tilting member 344 such that the solenoid pin of the tilting adjuster 400 is inserted therein.

Accordingly, the solenoid pin of the tilting adjuster 400 stretches out and is inserted in the tilting stopping groove 344a of the tilting member 344 to prevent the tilting member 344 from turning, when the apparatus is not in use, but when the carrier 200 tilts, the solenoid pin is separated from the tilting stopping groove 344a and allows the tilting member 344 to turn.

A second solenoid 700 may be disposed on the tilting members 344 of the tilting brackets and sliding stopping grooves 242 to which the second solenoids 700 are selectively coupled may be formed on the sliding rails 240 of the carrier 200.

That is, the second solenoids 700 with a solenoid pin protruding inward are disposed at the tilting members 344 of the tilting brackets 340 and the sliding stopping grooves 242 in which the solenoid pins of the second solenoids 700 are inserted are formed at the sides of the sliding rails 240.

This is for controlling forward/rearward sliding of the carrier 200, so, with the carrier 200 fully stowed or drawn out, when the solenoid pins of the second solenoids 700 are inserted in the sliding stopping grooves 242, forward/rearward sliding of the carrier 200 is prevented, but when the solenoid pins are separated from the sliding stopping grooves 242, the carrier 200 is unlocked, and accordingly it can move.

The sliding stopping grooves 242 of the sliding rails 240 of the carrier 220 may be formed at positions corresponding to the second solenoids 700, with the carrier 200 fully drawn out or stowed.

The first solenoids and the second solenoids 700 can operate in combination with the operation lever 222 or a specific switch, the operation of the second solenoids 700 is controlled, when the carrier 200 slides, and the operation of the first solenoids is controlled, when the carrier 200 tilts, thereby moving and tilting the carrier 200.

The damping units 500 may be gas lifts with a first end or ends pivotably connected to the rear ends of the guide rails 100 and a second end or ends pivotably connected to the tilting rails 300.

As described above, the carrier 200 tilts at a predetermined angle, after being fully drawn out. However, since various objects, including a bicycle, can be loaded on the carrier 200, the larger the load on the carrier 200, the faster the carrier 200 turns to tilt, so the carrier 200 may be broken.

Accordingly, the damping units 500 with a first end and second end pivotably connected to the guide rails 100 and the tilting rails 300, respectively, are provided to prevent the carrier 200 from tilting at too high of a speed by reducing the turning speed of the tilting rails 300. Further, since the damping units 500 are gas lifts, the carrier 200 can smoothly tilt.

Support ends 140 are formed at the guide rails 100 by bending the rear ends downward at a predetermine angle, so the tilting rails 300 that have turned can keep the positions in contact with the support ends 140.

Since the support ends 140 are formed by bending the rear ends of the guide rails 100 at a predetermined angle, the tilting angle of the carrier 200 can be set by the bending angle of the support ends 140. Further, since the support ends 140 are formed at the guide rails 100, the carrier 100 that has tuned is supported in contact with the support ends 140 and kept at the tilting position.

A damping member or members 145 may be disposed on the support ends 140 of the guide rails 100 so that shock is offset by the damping members 145 when the tilting rails 300 come in contact with them. The damping members 145 may be air springs or may be other various members that absorb shock. Since the damping members 145 are disposed on the support ends 140 of the guide rails 100, noise due to contact with the carrier 200 is minimized and load is supported, thereby ensuring efficient support force.

Figure 5:
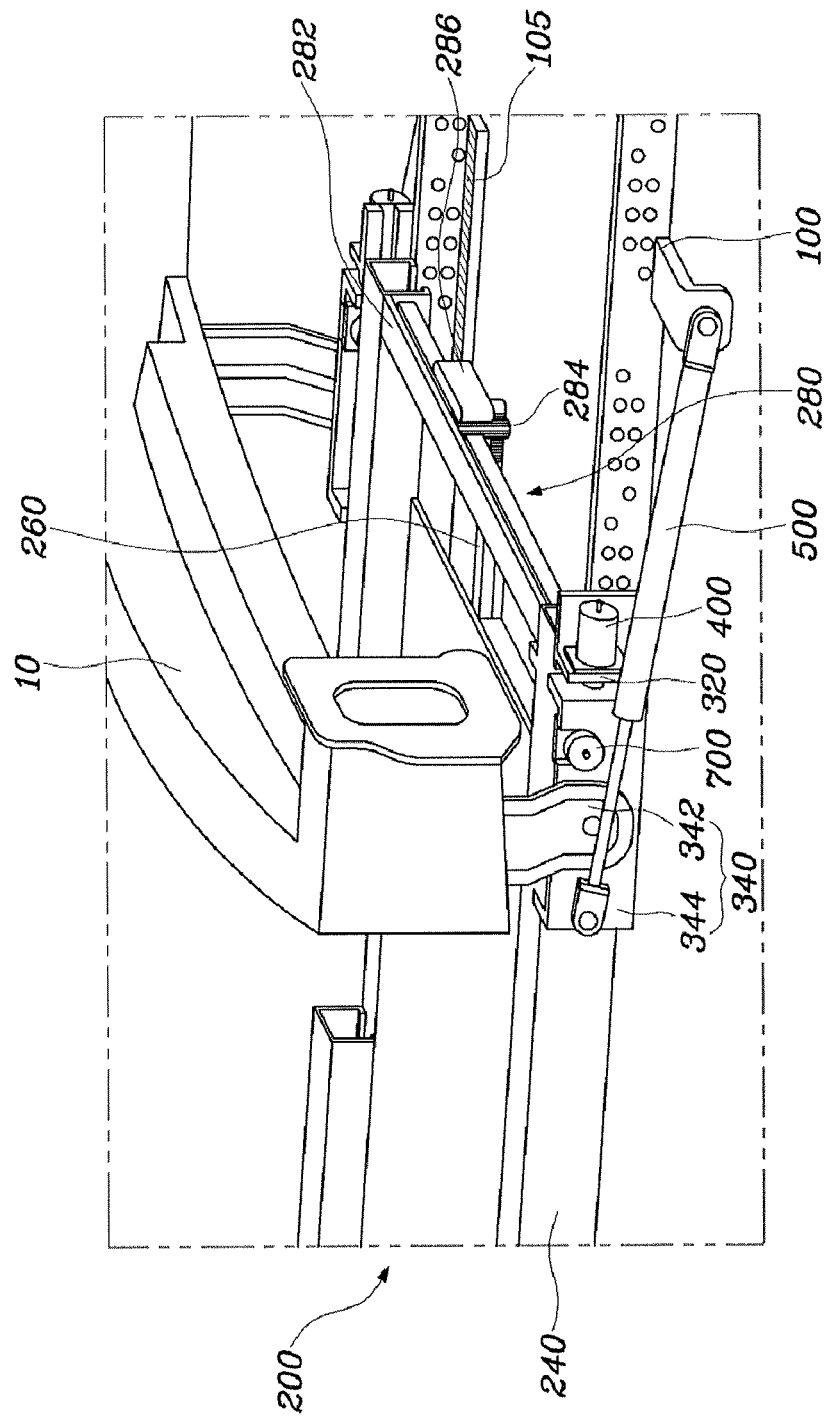
FIG. 5 is a view illustrating the carrier apparatus for a vehicle shown in FIG. 1.
Figure 6:
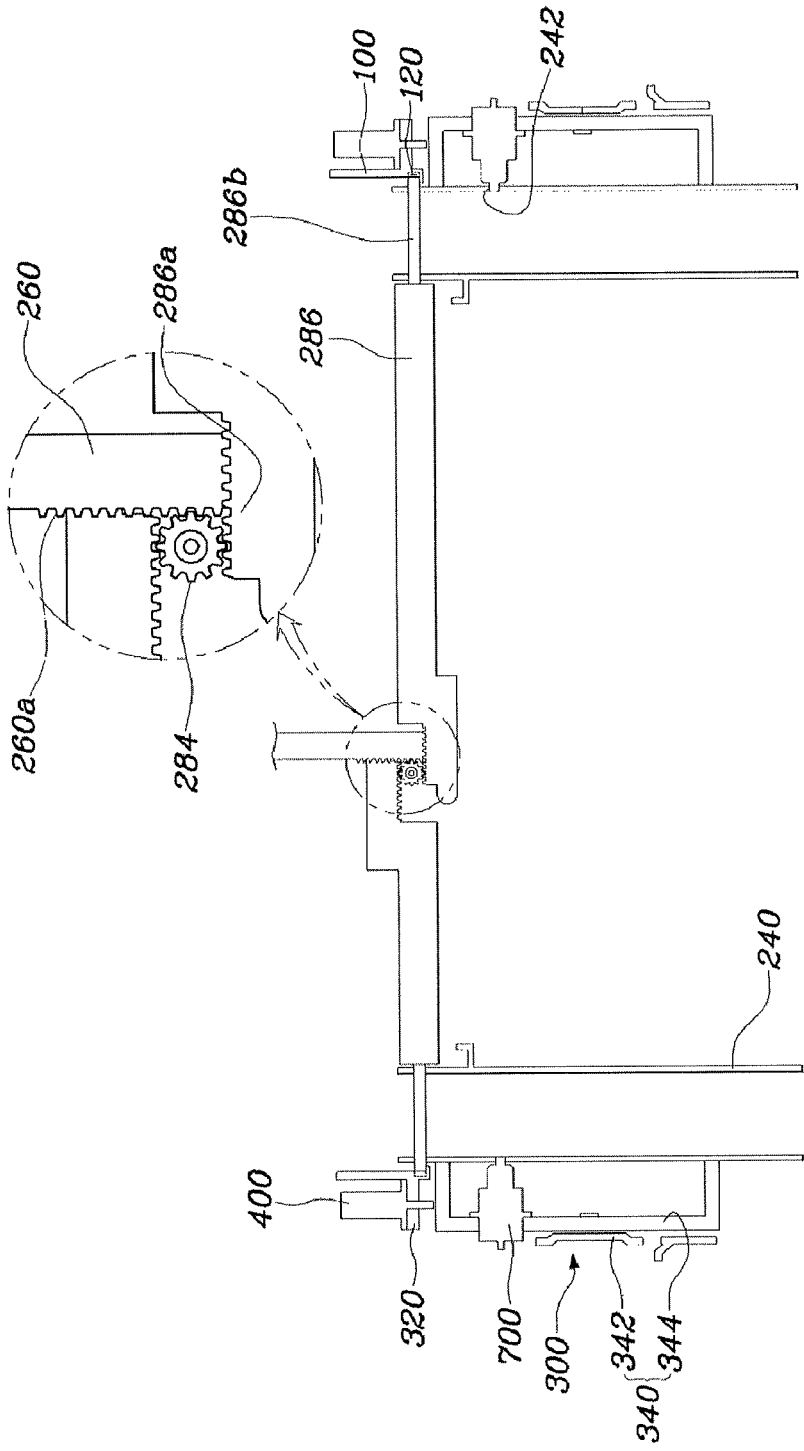
FIG. 6A is a view illustrating the carrier apparatus for a vehicle shown in FIG. 1.
FIG. 6B is a partially enlarged view of FIG. 6A.
Figure 7:
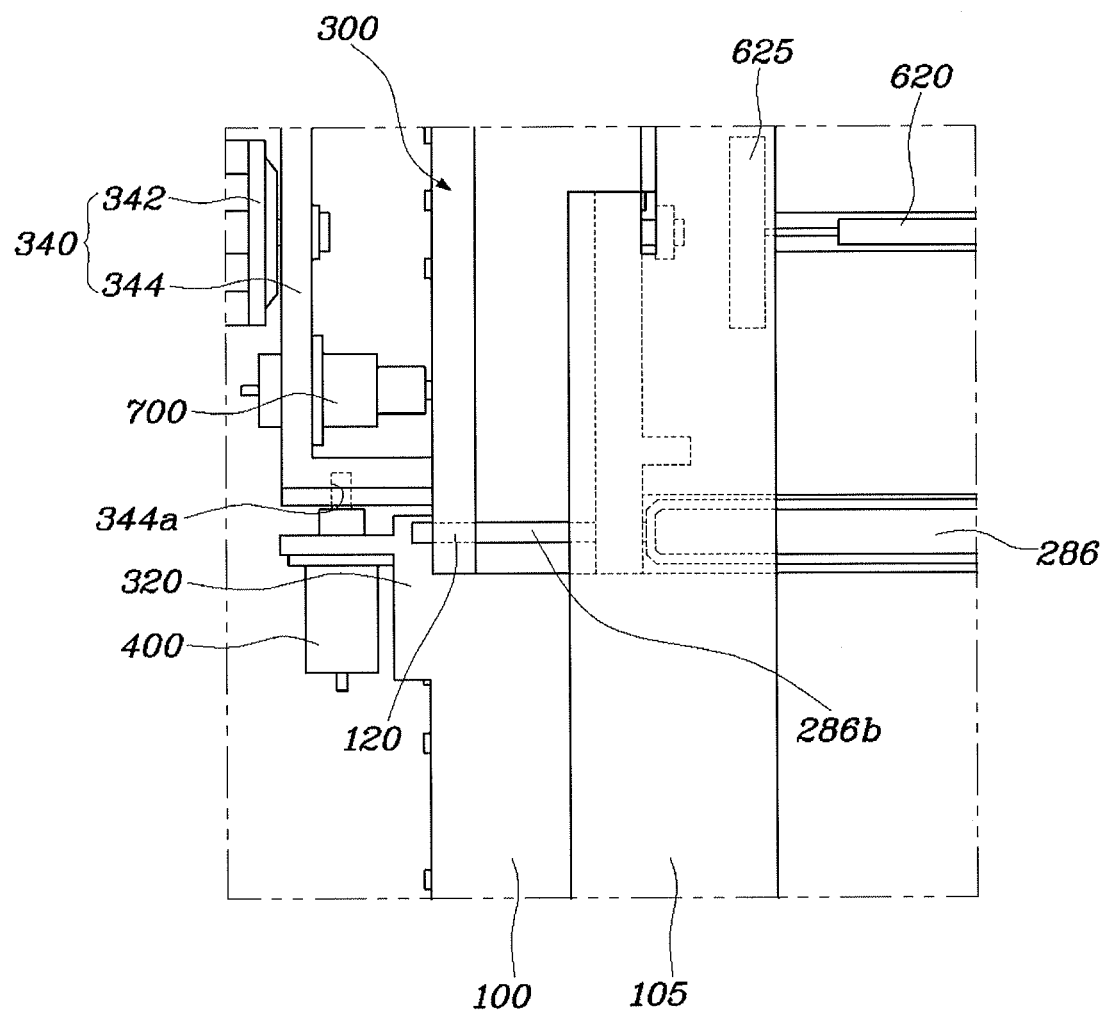
FIG. 7 is a view illustrating the carrier apparatus for a vehicle shown in FIG. 1.
Figure 8:
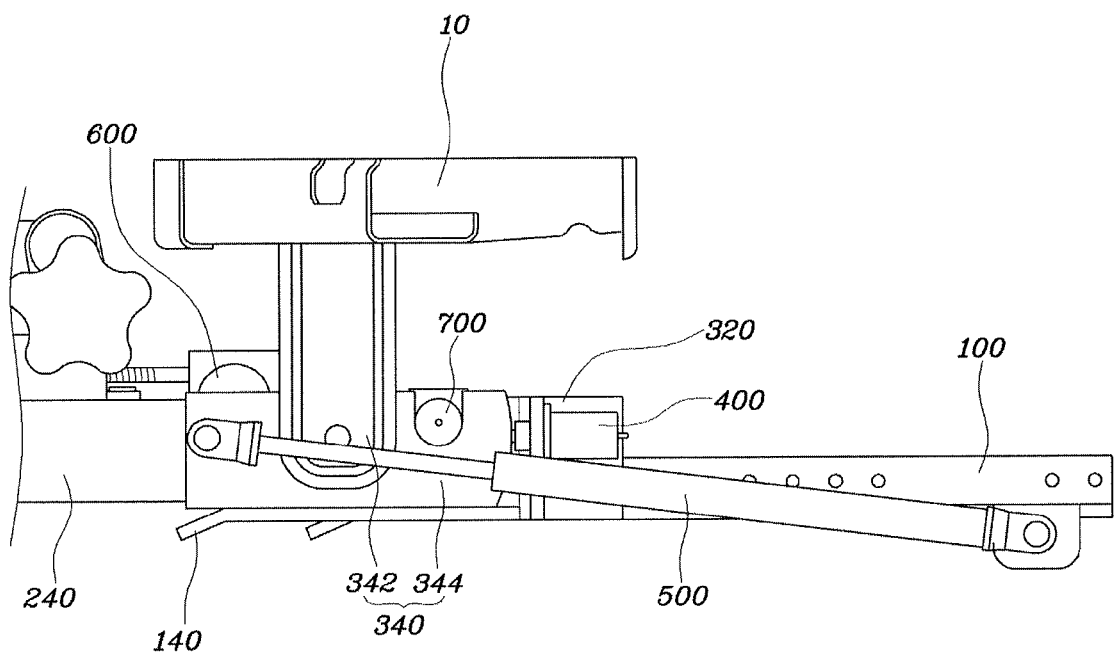
FIG. 8 is a view illustrating the carrier apparatus for a vehicle shown in FIG. 1.
Figure 9:
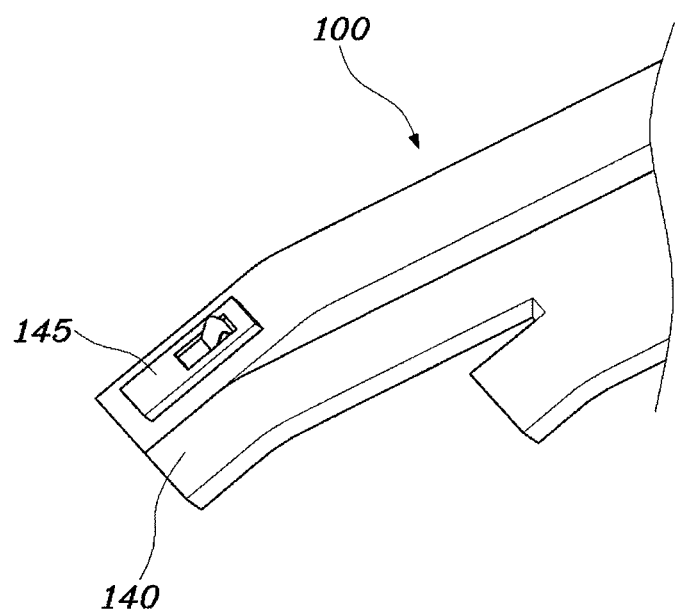
FIG. 9 is a view illustrating the carrier apparatus for a vehicle shown in FIG. 1.

In the operation of the carrier apparatus for a vehicle of the present invention, as shown in FIG. 5, the carrier is stowed in the rear bumper beam 10, not exposed to the outside, when not in use.

In order to load a bicycle, a user activates the driving unit 600 through a specific switch. The switch may be disposed on the tail gate or around the driver's seat, and when the switch is operated, the driving unit 600 operates and the driving link 620 rotates.

As the driving link 620 rotates, the pinion gears 625 rotate and the rack gears 105 engaged with the pinion gears 625 move so that the sliding rails 240 of the carrier 200 move rearward along the guide rails 100.

Accordingly, when the carrier 200 is fully drawn out from the rear bumper beam 10, the user stops the rotation of the driving link 620 by stopping the driving unit 600 and checks whether to tilt the carrier 200.

When the user operates the operation lever 222 to tilt the carrier 200, the movable bar 260 moves forward, the circular gear 284 of the tilting holding mechanism 280 rotates and the horizontal gears 286a of the sliding bars 286 engaged with the circular gear 284 move, such that the sliding bars 286 move inward and separate from the guide rails 100.

Further, the first solenoids at the fixing brackets 320 of the tilting rails 300 separate from the tilting brackets 340 and the tilting brackets 340 are allowed to turn, and accordingly, as the tilting rails 300 turn, the carrier 200 tilts.

While the tilting rails 300 turn, the turning speed is reduced by the damping units 500 connected to the tilting rails 300 and the guide rails 100, and when the tilting rails 300 finish turning at a predetermined angle, they come in contact with the support ends 140 of the guide rails 100 and the tilting angle of the carrier 200 is maintained.

According to the carrier apparatus for a vehicle which has the structure described above, the carrier is installed inside the rear bumper beam 10 at the rear of a vehicle, so it is not exposed to the outside when not in use, but automatically slides out from the rear bumper beam 10 to load a bicycle, and therefore, the external appearance of a vehicle is maintained and convenience is also improved.

Further, since the carrier can tilt after being drawn out, rear loading can be more conveniently performed, and since shock in tilting is removed, the carrier can smoothly tilt, thereby improving the commercial value.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A carrier apparatus for a vehicle, comprising:
   guide rails substantially symmetrically disposed under a rear bumper beam and extending in a front-rear direction;
   a carrier having a panel and sliding rails extending from both sides of the panel to the corresponding guide rails, and stowed or drawn out under the rear bumper beam by sliding in the front-rear direction along the guide rails;
   tilting rails extending on same lines at rear ends of the guide rails and capable of tilting on the rear bumper beam;
   tilting adjusters disposed adjacent the tilting rails at the rear ends of the guide rails and restricting turning of the tilting rails by being selectively coupled to the tilting rails; and
   damping units having first ends connected to the guide rails and second ends connected to the tilting adjusters, and reducing turning speed of the tilting rails when the tilting adjusters are separated from the tilting rails and the tilting rails turn,
   wherein each of the tilting rails includes a fixing bracket disposed at a rear end of a corresponding guide rail and a tilting bracket disposed behind the fixing bracket at the rear end of the corresponding guide rail and capable of turning on the rear bumper beam.

2. The carrier apparatus for a vehicle of claim 1, wherein an operation lever is disposed on the panel of the carrier, and the carrier apparatus further comprises:
   a movable bar extending forward from the operation lever and moving in the front-rear direction when the operation lever is operated; and
   a tilting holding mechanism connecting the sliding rails with each other at a rear end of the carrier, connected with the movable bar, and selectively coupled to or separated from the guide rails by moving laterally when the movable bar moves in the front-rear direction.

3. The carrier apparatus for a vehicle of claim 2, wherein the tilting holding mechanism includes:
   a support bar connecting the sliding rails with each other at the rear end of the carrier;
   a circular gear hinged to the support bar and rotating with the front-rear movement of the movable bar; and
   sliding bars selectively coupled to or separated from the guide rails by laterally sliding along the support bar, and having first ends supported by the carrier and second ends having horizontal gears engaged with the circular gear.

4. The carrier apparatus for a vehicle of claim 3, wherein a first end of the movable bar is connected to the operation lever and a second end of the movable bar has a coupling gear extending in the front-rear direction and engaged with the circular gear.

5. The carrier apparatus for a vehicle of claim 3, wherein fixing pins supported on the carrier through the sliding rails of the carrier are formed at the first ends of the sliding bars and fixing grooves in which the fixing pins of the sliding bar are inserted are formed at the guide rails.

6. The carrier apparatus for a vehicle of claim 3, wherein when the operation lever is operated to turn the carrier, the movable bar moves forward, and
   as the circular gear rotates with the forward movement of the movable bar, the horizontal gears move and the sliding bars move inward and separate from the guide rails.

7. The carrier apparatus for a vehicle of claim 1, wherein the fixing brackets of the tilting rails are fixed to the rear ends of the guide rails, and
   each tilting bracket includes a fixing member fixed to the rear bumper beam and extending downward and a tilting member disposed adjacent and behind a corresponding fixing bracket and capable of turning on the fixing member.

8. The carrier apparatus for a vehicle of claim 7, wherein a tilting stopping groove is formed at an end, adjacent the corresponding fixing bracket, of the tilting member of the tilting bracket and a tilting adjuster of the tilting adjusters selectively inserted into the tilting stopping groove of the tilting member is disposed on the corresponding fixing bracket.

9. The carrier apparatus for a vehicle of claim 8, wherein the tilting adjuster includes a first solenoid.

10. The carrier apparatus for a vehicle of claim 7, wherein a second solenoid is disposed on the tilting member of the tilting bracket and a sliding stopping groove to which the second solenoid is selectively coupled is formed on a corresponding sliding rail of the carrier.

11. The carrier apparatus for a vehicle of claim 1, wherein the damping units include gas lifts with first ends pivotably connected to the rear ends of the guide rails and second ends pivotably connected to the tilting rails.

12. The carrier apparatus for a vehicle of claim 1, wherein support ends are formed at the guide rails by bending the rear ends of the guide rails downward at a predetermined angle and the tilting rails that have turned are in contact with the support ends.

13. The carrier apparatus for a vehicle of claim 12, wherein damping members are disposed on the support ends of the guide rails so that shock is offset by the damping members when the tilting rails come in contact with the damping members.

14. The carrier apparatus for a vehicle of claim 1, wherein a driving unit is disposed on the carrier and has driving links extending laterally toward the sliding rails, and
   when the driving unit is operated, power is transmitted through the driving links so that the carrier slides along the guide rails.

15. The carrier apparatus for a vehicle of claim 14, wherein pinion gears are disposed on extending ends of the driving links, rack gears extending in the front-rear direction and engaged with the pinion gears are disposed on the guide rails, and as the driving links are rotated by the driving unit, the pinion gears move on the rack gears.

16. A carrier apparatus for a vehicle, comprising:
guide rails substantially symmetrically disposed under a rear bumper beam and extending in a front-rear direction;
a carrier having a panel and sliding rails extending from both sides of the panel to the corresponding guide rails, and stowed or drawn out under the rear bumper beam by sliding in the front-rear direction along the guide rails;
tilting rails extending on same lines at rear ends of the guide rails and capable of tilting on the rear bumper beam;
tilting adjusters disposed adjacent the tilting rails at the rear ends of the guide rails and restricting turning of the tilting rails by being selectively coupled to the tilting rails; and
damping units having first ends connected to the guide rails and second ends connected to the tilting adjusters, and reducing turning speed of the tilting rails when the tilting adjusters are separated from the tilting rails and the tilting rails turn,
wherein support ends are formed at the guide rails by bending the rear ends of the guide rails downward at a predetermined angle and the tilting rails that have turned are in contact with the support ends.

17. The carrier apparatus for a vehicle of claim 16, wherein damping members are disposed on the support ends of the guide rails so that shock is offset by the damping members when the tilting rails come in contact with the damping members.

18. A carrier apparatus for a vehicle, comprising:
guide rails substantially symmetrically disposed under a rear bumper beam and extending in a front-rear direction;
a carrier having a panel and sliding rails extending from both sides of the panel to the corresponding guide rails, and stowed or drawn out under the rear bumper beam by sliding in the front-rear direction along the guide rails;
tilting rails extending on same lines at rear ends of the guide rails and capable of tilting on the rear bumper beam;
tilting adjusters disposed adjacent the tilting rails at the rear ends of the guide rails and restricting turning of the tilting rails by being selectively coupled to the tilting rails; and
damping units having first ends connected to the guide rails and second ends connected to the tilting adjusters, and reducing turning speed of the tilting rails when the tilting adjusters are separated from the tilting rails and the tilting rails turn,
wherein an operation lever is disposed on the panel of the carrier, and
the carrier apparatus further comprises:
 a movable bar extending forward from the operation lever and moving in the front-rear direction when the operation lever is operated; and
 a tilting holding mechanism connecting the sliding rails with each other at a rear end of the carrier, connected with the movable bar, and selectively coupled to or separated from the guide rails by moving laterally when the movable bar moves in the front-rear direction.

19. The carrier apparatus for a vehicle of claim 18, wherein the tilting holding mechanism includes:
a support bar connecting the sliding rails with each other at the rear end of the carrier;
a circular gear hinged to the support bar and rotating with the front-rear movement of the movable bar; and
sliding bars selectively coupled to or separated from the guide rails by laterally sliding along the support bar, and having first ends supported by the carrier and second ends having horizontal gears engaged with the circular gear.

* * * * *